United States Patent [19]
Hull et al.

[11] Patent Number: 5,722,303
[45] Date of Patent: *Mar. 3, 1998

[54] MIXED-MU SUPERCONDUCTING BEARINGS

[75] Inventors: John R. Hull, Hinsdale; Thomas M. Mulcahy, Western Springs, both of Ill.

[73] Assignee: University of Chicago, Chicago, Ill.

[*] Notice: The term of this patent shall not extend beyond the expiration date of Pat. No. 5,540,116.

[21] Appl. No.: 523,262

[22] Filed: Sep. 5, 1995

Related U.S. Application Data

[63] Continuation-in-part of Ser. No. 25,950, Mar. 3, 1993, Pat. No. 5,540,116.

[51] Int. Cl.⁶ .................................................. G05G 1/00
[52] U.S. Cl. ............................ 74/572; 74/573 R; 310/349; 505/166
[58] Field of Search ...................... 74/572–574; 505/171, 505/843, 877, 166; 310/349, 191, 90.5

[56] References Cited

U.S. PATENT DOCUMENTS

| | | | |
|---|---|---|---|
| 3,026,151 | 3/1962 | Buchhold | 308/10 |
| 3,493,274 | 2/1970 | Emslie et al. | 308/10 |
| 3,572,854 | 3/1971 | Danby | 308/10 |
| 3,937,148 | 2/1976 | Simpson | 505/903 X |
| 3,954,064 | 5/1976 | Minovitch | 505/908 |
| 4,132,130 | 1/1979 | Schneider | 74/572 |
| 4,151,431 | 4/1979 | Johnson | 310/12 |
| 4,464,943 | 8/1984 | Andrews et al. | 74/5.46 |
| 4,498,048 | 2/1985 | Lee et al. | 505/844 X |
| 4,643,034 | 2/1987 | Favatella | 74/5.46 |
| 4,658,659 | 4/1987 | Gruber | 74/5.46 |
| 4,686,404 | 8/1987 | Nakazeki et al. | 310/90.5 |
| 4,702,090 | 10/1987 | Barclay et al. | 62/3 |
| 4,759,116 | 7/1988 | Jones . | |
| 4,797,602 | 1/1989 | West . | |
| 4,870,310 | 9/1989 | Triplett | 310/74 |
| 4,885,489 | 12/1989 | Stuhr | 310/78 |
| 4,886,778 | 12/1989 | Moon et al. | 505/1 |
| 4,939,120 | 7/1990 | Moon et al. | 505/1 |
| 4,956,571 | 9/1990 | Gordon et al. | 310/90.5 |
| 4,961,352 | 10/1990 | Downer et al. | 74/5.46 |
| 5,012,216 | 4/1991 | Jin | 335/216 |
| 5,027,280 | 6/1991 | Ando et al. | 364/474.16 |
| 5,126,317 | 6/1992 | Agarwala . | |
| 5,159,219 | 10/1992 | Chu et al. | 310/90.5 |
| 5,177,387 | 1/1993 | McMichael et al. | 310/90.5 |
| 5,193,266 | 3/1993 | Caputo . | |
| 5,196,748 | 3/1993 | Rigney | 310/90.5 |
| 5,209,068 | 5/1993 | Saji et al. | 62/3.1 |
| 5,209,916 | 5/1993 | Gruen | 423/446 |
| 5,214,981 | 6/1993 | Weinberger et al. | 74/573 R |
| 5,220,232 | 6/1993 | Rigney, II et al. | 310/90.5 |
| 5,245,270 | 9/1993 | Akiyama | 322/4 |

(List continued on next page.)

FOREIGN PATENT DOCUMENTS 2248690  4/1992  United Kingdom .................... 74/5.46

OTHER PUBLICATIONS

"Satellite Power Using a Magnetically Suspended Flywheel Stack," Kirk et al., *Journal of Power Sources*, vol. 22 (1988), pp. 301–311.

"Magnetic Forces in High-$T_c$ Superconducting Bearings," Moon, *Applied Electromagnetics in Materials*, vol. 1 (1990), pp. 29–35.

"High-Speed Rotation of Magnets on High $T_c$ Superconducting Bearings," Moon, et al., *Appl. Phys. Lett.*, vol. 56(4), Jan. 22, 1990, pp. 397–399.

(List continued on next page.)

*Primary Examiner*—Vinh T. Luong
*Attorney, Agent, or Firm*—Foley & Lardner; Michael D. Rechtin

[57] ABSTRACT

A mixed-mu superconducting bearing including a ferrite structure disposed for rotation adjacent a stationary superconductor material structure and a stationary permanent magnet structure. The ferrite structure is levitated by said stationary permanent magnet structure.

13 Claims, 6 Drawing Sheets

U.S. PATENT DOCUMENTS

| | | | |
|---|---|---|---|
| 5,254,730 | 10/1993 | Kilgore | 562/575 |
| 5,256,638 | 10/1993 | Weinberger et al. | 505/1 |
| 5,256,808 | 10/1993 | Alexandratos | 558/142 |
| 5,270,601 | 12/1993 | Rigney, II | 310/90.5 |
| 5,310,705 | 5/1994 | Mitlitsky et al. | 505/211 |
| 5,313,130 | 5/1994 | Shibayama et al. | 310/90.5 |
| 5,314,868 | 5/1994 | Takahata et al. | 505/166 |
| 5,320,800 | 6/1994 | Siegel et al. | 419/66 |
| 5,325,002 | 6/1994 | Rabinowitz | 505/166 |
| 5,330,967 | 7/1994 | Takahata et al. | 505/166 |
| 5,340,797 | 8/1994 | Hodge et al. | 505/4.7 |
| 5,346,618 | 9/1994 | Horwitz et al. | 210/198.2 |
| 5,360,892 | 11/1994 | Bonsignore et al. | 528/354 |
| 5,374,611 | 12/1994 | Dabrowski et al. | 505/500 |
| 5,384,176 | 1/1995 | Zimmerman et al. | 428/68 |
| 5,396,136 | 3/1995 | Pelrine | 310/90.5 |
| 5,436,516 | 7/1995 | Yamazaki et al. | 310/90.5 |

OTHER PUBLICATIONS

"Rotor Dynamics of Flywheel Energy Storage Systems," Jayaraman, et al, *Journal of Solar Energy Engineering*, vol. 113, Feb. 1991, pp. 11–18.

"A New Process with the Promise of High $J_c$ in Oxide Supeconductors," Murakami, et al., *Japanese Journal of Applied Physics*, vol. 28, No. 7, Jul. 1989, pp. 1189–1194.

"Levitation Forces, Relaxation and Magnetic Stiffness of Melt–Quenched $YBa_2Cu_3O_x$," Moon, et al., *Japanese Journal of Applied Physics*, vol. 29, No. 7, Jul. 1990, pp. 1257–1258.

"Materials Research Issues in Superconducting Levitation and Suspension as Applied to Magnetic Bearings," F.C. Moon and J.R. Hull, Proceedings of the 25th Intersociety Energy Conversion Engineering Conference, vol. 3, Aug. 12–17, 1990, pp. 425–431.

"Amplitude Dependence of Magnetic Stiffness in Bulk High–Temperature Superconductors," Basinger, et al, *Applied Physics Letter* 57(27) 31 Dec. 1990, pp. 2942–2944.

"Magnetic Bearings Using High–Temperature Superconductors: Some Practical Considerations," Weinberger et al, *Supercond. Sci. Technology* 3 (1990) pp. 381–388.

"Stability Projections for High Temperature Superconductors," Laquer et al, *IEEE Transactions On Magnetics*, vol. 25, No. 2, Mar. 1989.

"Levitation Force and Magnetic Stiffness In Bulk High–Temperature Superconductors," Chang et al., *J. Appl. Phys.* 67 (9) 1 May 1990, pp. 4358–4360.

"Phenomenology of Forces Acting Between Magnets and Superconductors," Hull et al, Proceedings of the 25th Intersociety Energy Conversion Engineering Conference, vol. 3, Aug. 12–17, 1990, pp. 432–437.

"Characterization of Composite High Temperature Superconductors For Magnetic Bearing Applications," Weinberger et al, Applied Superconductivity Conf., Snowmass Village, CO, Sep. 24–28, 1990. Published Mar. 1991, *IEEE Transactions on Magnetics*, vol. 27.

"Low friction in high temperature superconductor bearings," Weinberger, et al., *Applied Physics Letter* 59(9) 26 Aug. 1991, pp. 1132–1134.

"Testing and Evaluation of a Solar Photovoltaic Flywheel Energy Storage System," Jarvinen, et al. Presented at the 16th Intersociety Energy Conversion Engineering Conference, Atlanta, Georgia, 9–14 Aug. 1991.

"Stable Levitation of Steel Rotors Using Permanent Magnets and High–Temperature Superconductors," Hull et al., *J. Appl. Phys.* 76, 577–580 (1994).

"Magnetic Bearing Concepts for Turbomolecular Pumps," Rao, *Premag Technical Bulletin* No. C–1022, Jun. 1993.

MIXED-MU SUPERCONDUCTING BEARINGS

The patent application is a continuation-in-part of U.S. patent application Ser. No. 08/025,950, filed Mar. 3, 1993, now U.S. Pat. No. 5,540,116, and is further related to U.S. patent application Ser. No. 08/486,782 filed Jun. 7, 1995, as a divisional application of U.S. Pat. No. 5,540,116.

BACKGROUND OF THE INVENTION

The United States government has rights in this invention pursuant to Contract W-31-109-ENG-38 between the United States Department of Energy and the University of Chicago, representing Argonne National Laboratory.

The present invention is directed to superconducting bearings. More particularly, the present invention is directed to superconducting bearings offering increased stability and levitation force, as well as the structural integrity to rotate at very high speeds.

When superconducting bearings are used in flywheel energy storage devices, the efficiency of the flywheel can be very high and flywheels of this type become economic for diurnal energy storage and other applications where high energy efficiency is important. Diurnal storage of electricity is important to electric utilities in order to efficiently utilize base load generating plants and to meet the varying load demands of their customers. For example, the base load generating plants can charge storage units at night when demand is low. Peak electrical demands can then be met by discharging the storage units during the daytime peak hours. Energy storage can also play a substantial role in eliminating or postponing the installation of power lines with larger capacity. Power can be transmitted at night to a substation or user energy storage unit when demand is low, and then during peak power times, the energy storage units can be discharged. The placement of the energy storage units can occur in various parts of the electrical distribution system: utility parks where large amounts of energy are stored; in tandem with photovoltaic or wind energy generation facilities that are time dependent; substation traits; individual companies and houses. The invention can also be used for energy storage on electric vehicles such as cars and buses, or as wayside energy storage for electric trains or other transit vehicles.

Flywheels are often considered for energy storage applications. Their primary advantages are modularity, mechanical simplicity (low cost), high energy storage density (Wh/kg), and high efficiency input and output of electrical energy. The ability to produce high strength flywheel rotors and the ability to efficiently transfer energy in and out of a flywheel are well known and will not be discussed herein.

The primary disadvantage of conventional flywheels is inefficiency in standby storage mode. These losses occur because the bearings that support the flywheel structure produce high rotational losses. The present invention provides bearings having very low rotational losses and can enable standby losses in flywheels to be 0.1%/hr or less. High temperature superconductor bearings designed in accordance with one form of the invention provide passive stability in all directions; i.e., they provide a positive stiffness in all displacement directions. Further, they allow rotational motion with very low friction.

A preferred high temperature superconductor bearing embodiment of the present invention provides a number of improvements that decrease rotational losses and overcome reluctance instability. Other forms of the invention provide these advantages and incorporate a ferromagnetic part of a rotor directly into the composite winding of the flywheel, allowing even higher rotor speeds to be obtained. Another preferred embodiment enables greater levitation force to be produced while still providing other previously described advantages of the invention.

It is therefore an object of the present invention to provide a low-loss mixed-mu high temperature superconductor bearing that can enable a flywheel energy storage device to be highly efficient.

It is a further object of the present invention to provide novel method and apparatus that overcome reluctance instabilities in mixed-mu high temperature superconductor bearings.

It is a further object of the present invention to provide a mixed-mu high temperature superconductor bearing capable of rotating at high velocities without sacrificing the bearing's structural integrity.

It is a further object of the present invention to provide high levitation pressures in a mixed-mu high temperature superconductor bearing.

These objects and other advantages of the invention will be readily apparent from the following description of the preferred embodiments thereof, taken in conjunction with the accompanying drawings described hereinbelow.

DETAILED DESCRIPTION OF PREFERRED EMBODIMENTS

Figure 1:
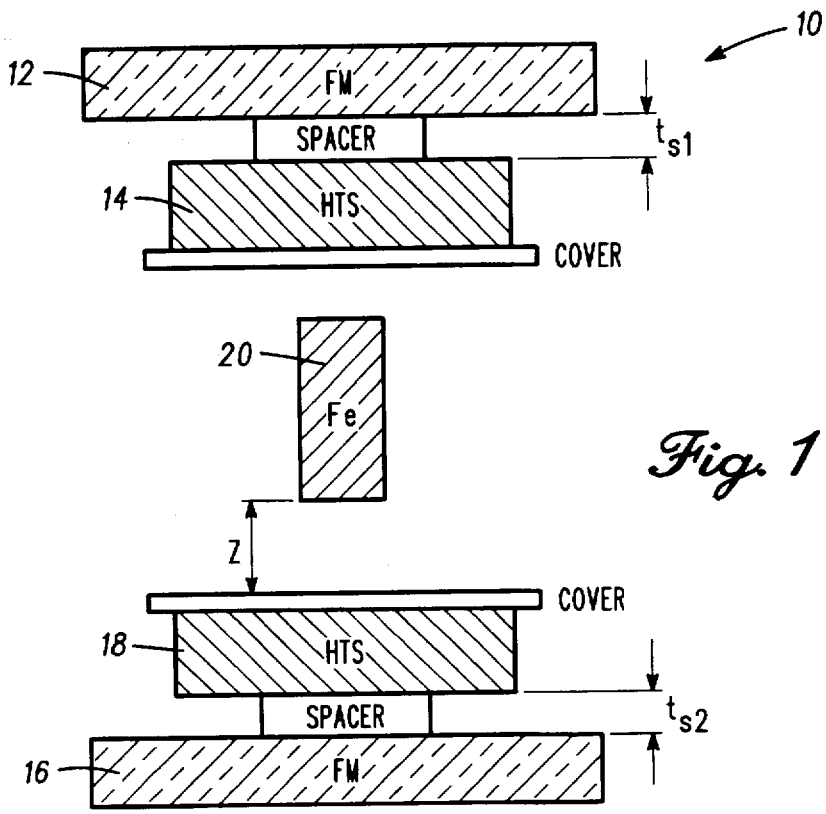
FIG. 1 illustrates a mixed-mu bearing constructed in accordance with one form of the invention.

A basic mixed-mu bearing constructed in accordance with one form of the invention is indicated generally at 10 in FIG. 1. The basic mixed-mu bearing 10 is preferably comprised of a stationary permanent magnet system, stationary high-temperature superconductors, and a rotating ferromagnet (e.g., magnetic steel). The bearing 10 is referred to as "mixed-mu" because of the use of both ferromagnetic (mu>1) and diamagnetic (mu<1) phenomena in the levitation, where "mu" refers to the magnetic permeability of a component.

A first stationary permanent magnet 12 is fixed above and adjacent a stationary upper high temperature superconductor 14 and a second permanent magnet 16 is disposed below and adjacent a stationary lower high temperature superconductor 18. A rotor 20 is disposed for rotation vertically between the two stationary permanent magnet/high temperature superconductor pairs as shown in FIG. 1. While the rotor 20 can comprise a variety of durable materials, preferably ferromagnetic material, such as steel, is used.

The entire bearing 10 is field-cooled (i.e., the high temperature superconductors 14 and 18 are immersed in liquid nitrogen until their temperature lowers sufficiently to enter the superconducting state) with the rotor 20 at approximately vertical equilibrium (with the upward magnetic force nearly balancing the downward gravitational force). The high temperature superconductors 14 and 18 are encased in a conventional liquid nitrogen cryogenic chamber, which is not shown for increased clarity. The entire bearing assembly is encased in a conventional vacuum chamber, which is also not shown.

The permanent magnets 12 and 16 are both polarized vertically in the same direction and induce magnetization in the rotor 20. Without the high temperature superconductors 14 and 18 in the superconducting state, the bearing 10 is radially stable but vertically unstable. Accordingly, the rotor 20 generally stays centered along its vertical axis of symmetry, but either falls toward the second permanent magnet 16 or rises toward the first permanent magnet 12. Because of the diamagnetic properties of the high temperature superconductors 14 and 18, magnetization of the steel in the rotor 20 induces shielding currents in the high temperature superconductors 14 and 18. This results in a repulsive force between the high temperature superconductors 14 and 18 and the steel in the rotor 20 in this embodiment. This repulsive force increases as the distance between the steel and one of the high temperature superconductors 14 and 18 decreases. This diamagnetic property tends to stabilize the bearing 10 in the vertical direction. When the steel is close enough to one of the high temperature superconductors 14 and 18, the stabilizing influence of one of the high temperature superconductors 14 and 18 is enough to overcome the destabilizing influence of the permanent magnet/ rotor interaction.

Flux pinning in the high temperature superconductors 14 and 18 further acts to stabilize the bearing 10. This flux pinning is most evident with "Type II" superconductor materials that allow some magnetic flux to enter the materials. Once the high temperature superconductors 14 and 18 are field-cooled, one or more of the permanent magnets 12 and 16 can be moved vertically to adjust the vertical position of the rotor.

The present invention can also work with only a single high temperature superconductor or single permanent magnet as discussed in the parent application (U.S. patent application Ser. No. 08/025,950, filed Mar. 3, 1993) of the present application. Alternatively, additional superconductors and magnets can be added to the embodiments disclosed herein without departing from the invention.

In another preferred embodiment of the invention, rotational losses are lessened by using permanent magnets 12 and 16 with a high degree of rotational symmetry. To a first approximation, the high temperature superconductors 14 and 18 experience a constant magnetic field and no loss. The only actual losses are the hysteresis and eddy currents in the rotating rotor 20 (which preferably comprises steel) which are extremely small. High mechanical strength of the rotor 20 allows the rotor 20 to spin very fast without structural failure or degradation.

During experiments on the mixed-mu high temperature superconductor bearing 10, it was noted that some geometries exhibit a reluctance instability. The instability is especially prominent for geometries of the rotor 20 in which the radius is larger than the height of a cylindrical shell or tube-shaped rotor 20.

Figure 2:
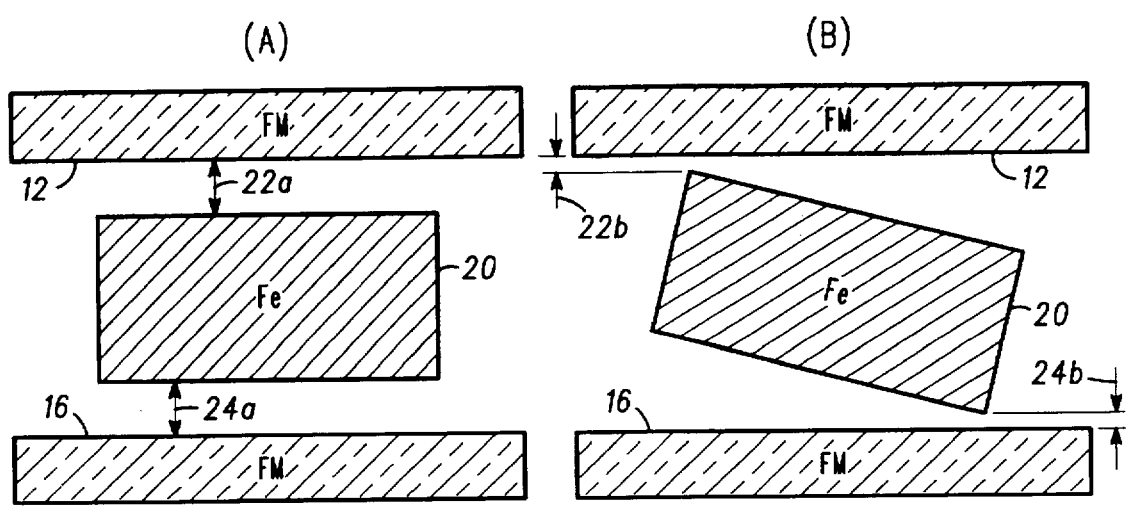
FIG. 2A shows a mixed-mu bearing without reluctance instability effects.
FIG. 2B shows a mixed-mu bearing experiencing reluctance instability.

The basic configuration of the reluctance instability is illustrated by FIGS. 2A and 2B. The preferred levitational orientation of the rotor 20 is shown in FIG. 2A. The air gap in a magnetic circuit in the vicinity of the rotor 20 is composed of distances 22a plus 24a. FIG. 2B illustrates the position of the rotor 20 when the instability is active and the rotor 20 tilts. It is seen here that the effective air gap 22b plus 24b is diminished compared with FIG. 2A. Because the mu of the rotor is so much larger than that of air, the magnetic flux prefers to go directly through smaller air gaps 22b and 24b and diagonally through the rotor 20. In other words, the total reluctance decreases when the rotor 20 tilts. This is the basis of the reluctance instability.

It has been shown that long narrow cylinders or shells can be stably levitated, whereas squat cylinders or rings undergo substantial reluctance instability. However, for many practical applications, it is desirable to construct the rotors 20 with short height. Preferred embodiments of the invention can overcome the reluctance instability in the mixed-mu high temperature superconductor bearing 10.

Figure 3:
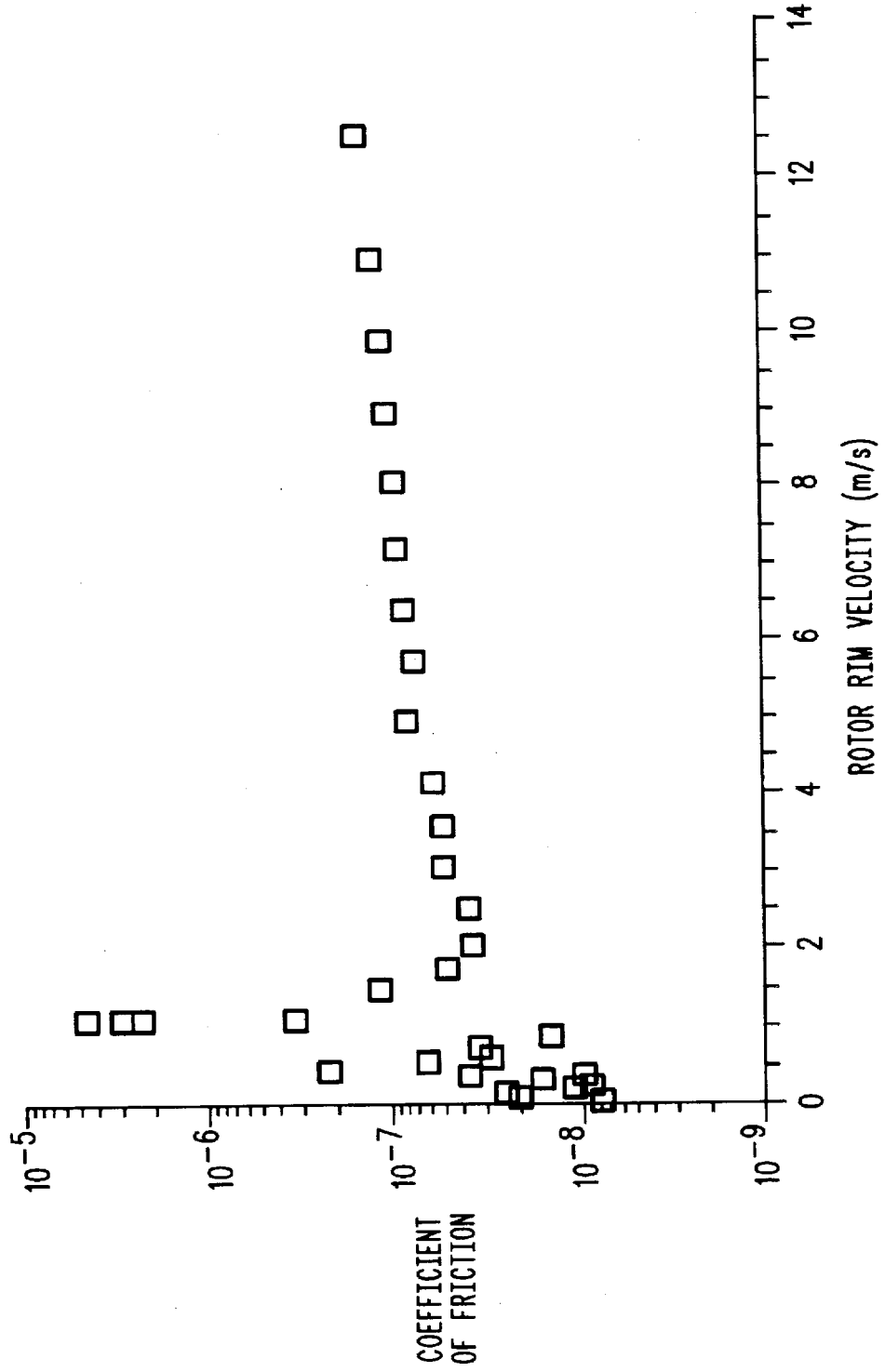
FIG. 3 illustrates the coefficient of friction of a mixed-mu bearing as a function of rotor rim velocity.

As an indication of the low friction potential of the mixed-mu high temperature superconductor bearing 10, the coefficient of friction (hereinafter "COF") as a function of the rim velocity of the rotor 20 is shown in FIG. 3. In this case, the rotor 20 comprised a Mn-ferrite sintered material. The advantage of such a rotor 20 over a steel form of the rotor 20 is that the electrical conductivity of the ferrite is much smaller, so that eddy current losses are small. No special attempt was made to use uniform permanent magnets in this experiment, and the losses could be made even smaller if a more homogeneous set of the permanent magnets 12 and 16 were used. A linear extrapolation of the COF shows that a rim velocity greater than 100 m/s would be reached before the COF reached $1.0 \times 10^{-6}$. Such a low value (compared to prior art designs) verifies this structure can be useful for a low-loss flywheel energy storage system.

Another preferred embodiment of the present invention locates the rotor 20 such that the rotor 20 is adjacent an air gap in the radial or azimuthal direction. If the rotor 20 begins to tilt, the total reluctance of the magnetic system is increased. The ferrite rotor 20 that was used in the experiment (whose results are shown in FIG. 3) is preferably constructed in this manner. Preferably, a significant gap of nonmagnetic material is provided between each of the ferrite grains.

In all embodiments of the present invention where permanent magnets are not part of the rotor 20, the rotor 20 is preferably mechanically constrained before and during (but not after) the field cooling of the superconductors 14 and 18. It will be apparent that the rotor 20 can comprise any material with high magnetic permeability (e.g., ferrite, magnetic steels or nickel and its alloys) and is preferably of high mechanical strength. Further, the rotor 20 can comprise a wide variety of shapes including, but not limited to, cylinders, rings and even non-circular shapes.

The rotor 20 can also comprise a variety of materials in various shapes and configurations. For example, electrically nonconductive magnetic ferrite can be sintered into the shape desired for the rotor 20. Alternatively, ferrite powder can be mixed or placed into an epoxy or other nonconducting, nonmagnetic matrix. Another preferred embodiment uses steel, nickel, or other conductive powder in a sintered form or in an epoxy or other nonmagnetic matrix. Yet another embodiment uses the ferrite powder as ballast in the winding of a fiber composite ring (or other desired shape). Composite rings can be formed by incorporating a powdered mass or "ballast" into the matrix material (usually epoxy). By changing the density of the composite as a function of radius, radial stresses in the final composite can be minimized or eliminated. Because the composite is mechanically weakest in the radial direction, this allows the composite to spin faster before breaking. By using ferrite (or steel) powder as the ballast, the mechanical strength of the bearing rotor 20 is maximized and there is a significant radial (and circumferential) reluctance to overcome any reluctance instability.

Figure 4:
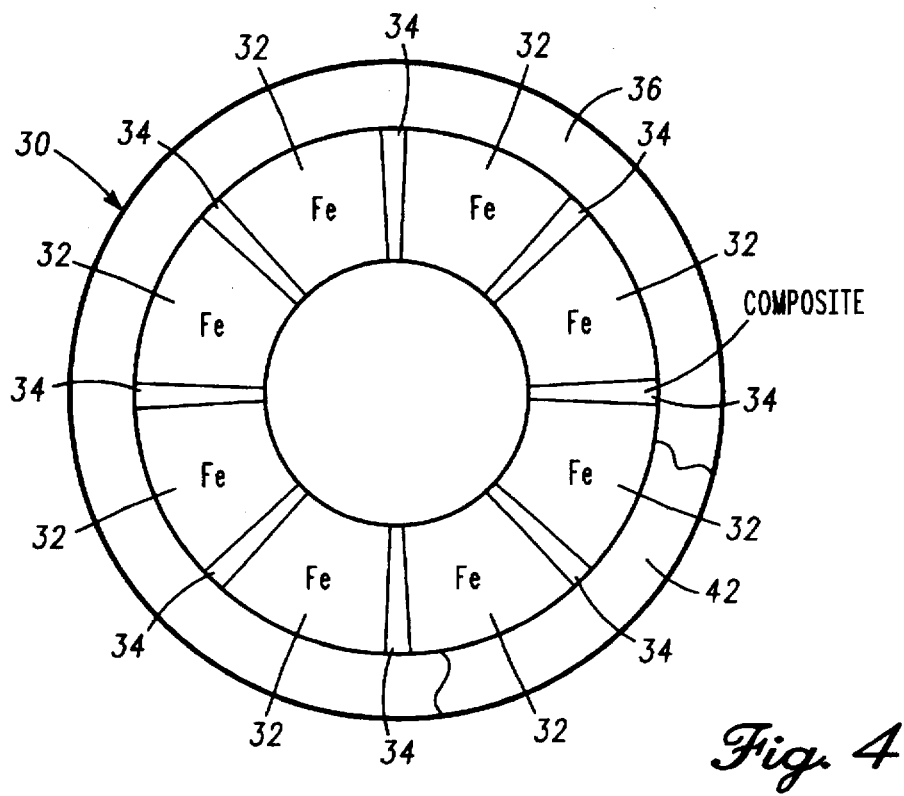
FIG. 4 shows a top view of a mixed-mu bearing rotor using ferrite or steel wedges to increase radial and circumferential reluctance.

A further preferred embodiment of the invention embodiment is shown in a horizontal cross-sectional view in FIG. 4. The figure is shown for the rotor 20 having a ring geometry 30, but can also take the form of a cylinder or other similar shape. Alternate steel (or ferrite) wedges 32 are separated by nonmagnetic wedges 34 such as epoxy or composite-epoxy. The entire ring 30 can be optionally surrounded by a composite ring 36 to increase the overall mechanical integrity when the rotor 20 is spun to high speeds. The nonmagnetic wedges 34 provide the desired reluctance in the circumferential direction.

Figure 5:
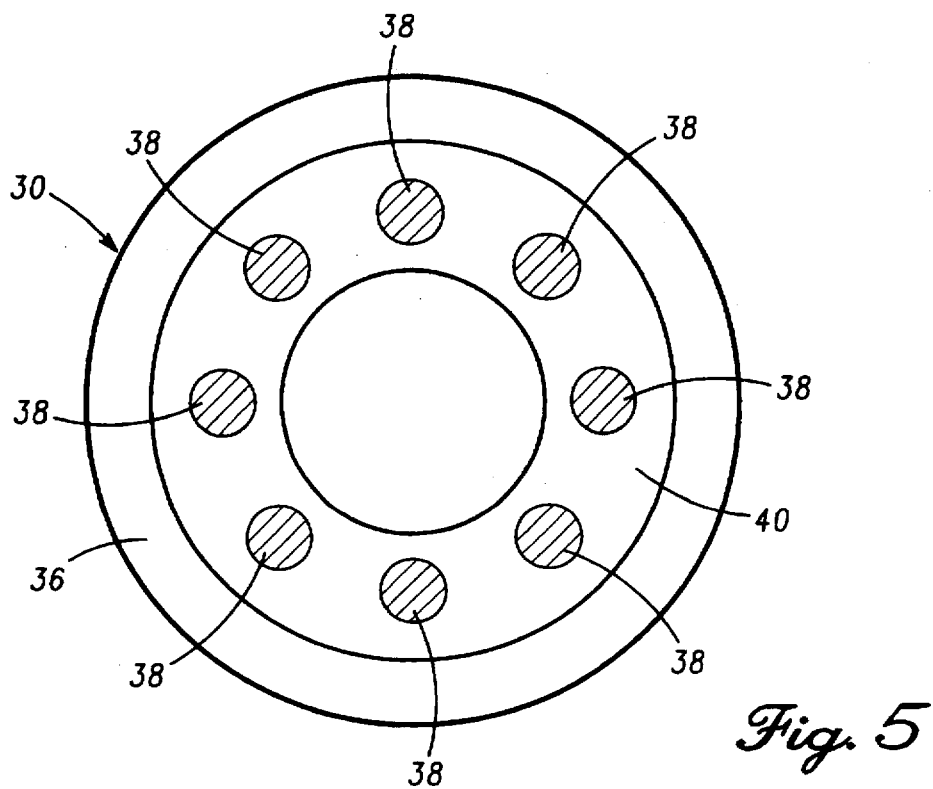
FIG. 5 illustrates a top view of a mixed-mu bearing rotor including ferrite or steel pins.

A further embodiment based around the geometry shown in FIG. 4 uses the steel wedges 32 constructed from nonisotropic laminations so that there is a higher magnetic permeability mu value in the vertical direction than in the azimuthal direction. Another preferred embodiment of this type is shown in FIG. 5, in which a series of steel (or ferrite) pins 38 is located within a nonmagnetic matrix 40. The pins 38 can also be staggered in the azimuthal direction as shown in FIG. 6.

Figure 6:
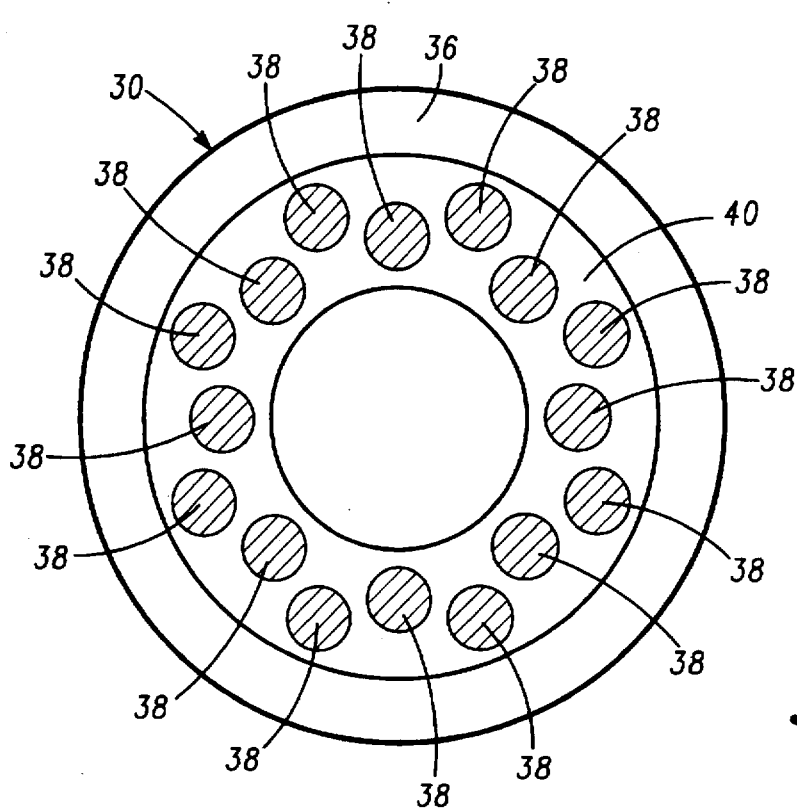
FIG. 6 shows a top view of a mixed-mu bearing including staggered ferrite or steel pins.

A disadvantage of the geometries shown in FIGS. 4–6 is that the magnetization of the rotor 20 is not homogeneous in the azimuthal direction. This inhomogeneity will induce hysteresis losses in the high temperature superconductor components as the rotor 20 rotates. To partially overcome this disadvantage, the top and bottom of the rings 30 can be covered by a ferromagnetic plate 42. The thickness of the ferromagnetic plate is preferably thin relative to the height of the steel wedges 32 or pins 38. The ferromagnetic plate 42 smooths out the inhomogeneities experienced by the high temperature superconductors 14 and 18.

Figure 7:
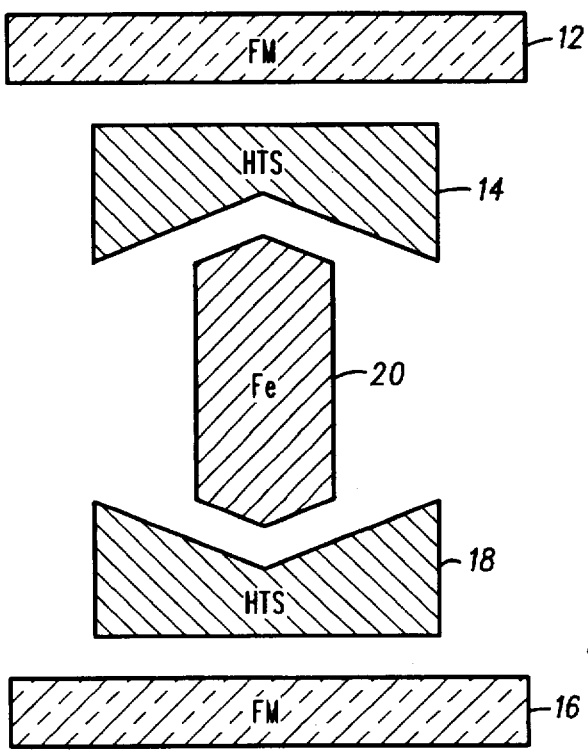
FIG. 7 illustrates a side view of an alternative embodiment of a mixed-mu bearing with a rotor surface shaped to lessen the effects of reluctance instability.

Another preferred embodiment shapes the bottom of the rotor 20, as shown in FIG. 7, so that the reluctance increases if the rotor 20 is tipped. While this simplifies the construction of the rotor 20, it complicates the high temperature superconductors 14 and 18 and high temperature superconductor-cryostat construction. It is desirable to have the high temperature superconductors 14 and 18 as close to the rotor 20 as possible in order to maximize stability. The preferred embodiment of FIG. 7 can provide this advantageous result.

One of the disadvantages of the geometry shown in FIG. 1 is that the levitational force is not very large. If the magnetic field is large enough to saturate the magnetization of the rotor 20, it will have nearly constant magnetization M. Then the levitation force F per unit volume will be given by $$F = M\, dH/dz,$$

where H is the applied magnetic field and z is the vertical coordinate. Ideally, one desires dH/dz to be uniform over the volume of the rotor 20. If dH/dz is not uniform, then the magnetic system produces a magnetic stiffness on the rotor 20. This stiffness is always destabilizing. To stabilize the rotor 20, dH/dz should be as large as possible, with $d^2H/dz^2$ as small as possible.

Figure 8:
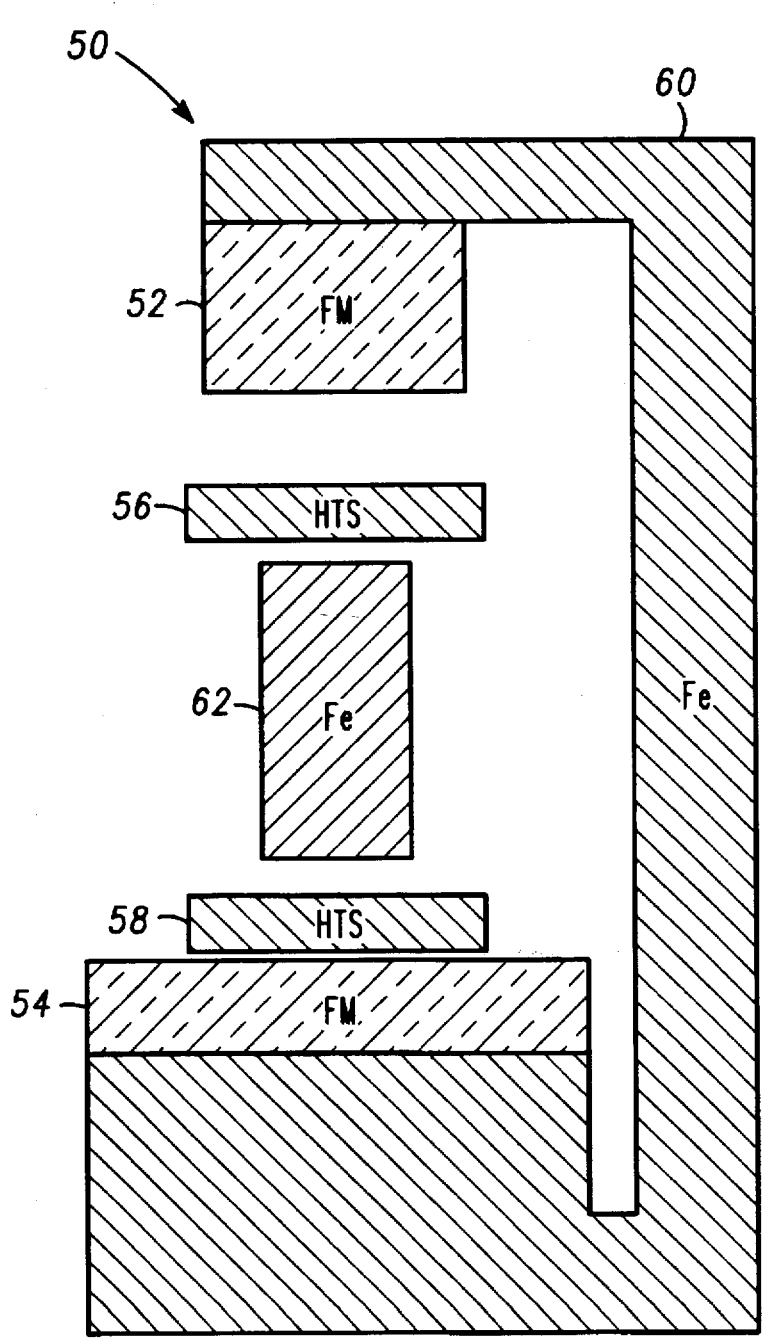
FIG. 8 shows another alternative embodiment of a mixed-mu bearing design capable of achieving large levitation force.
Figure 9:
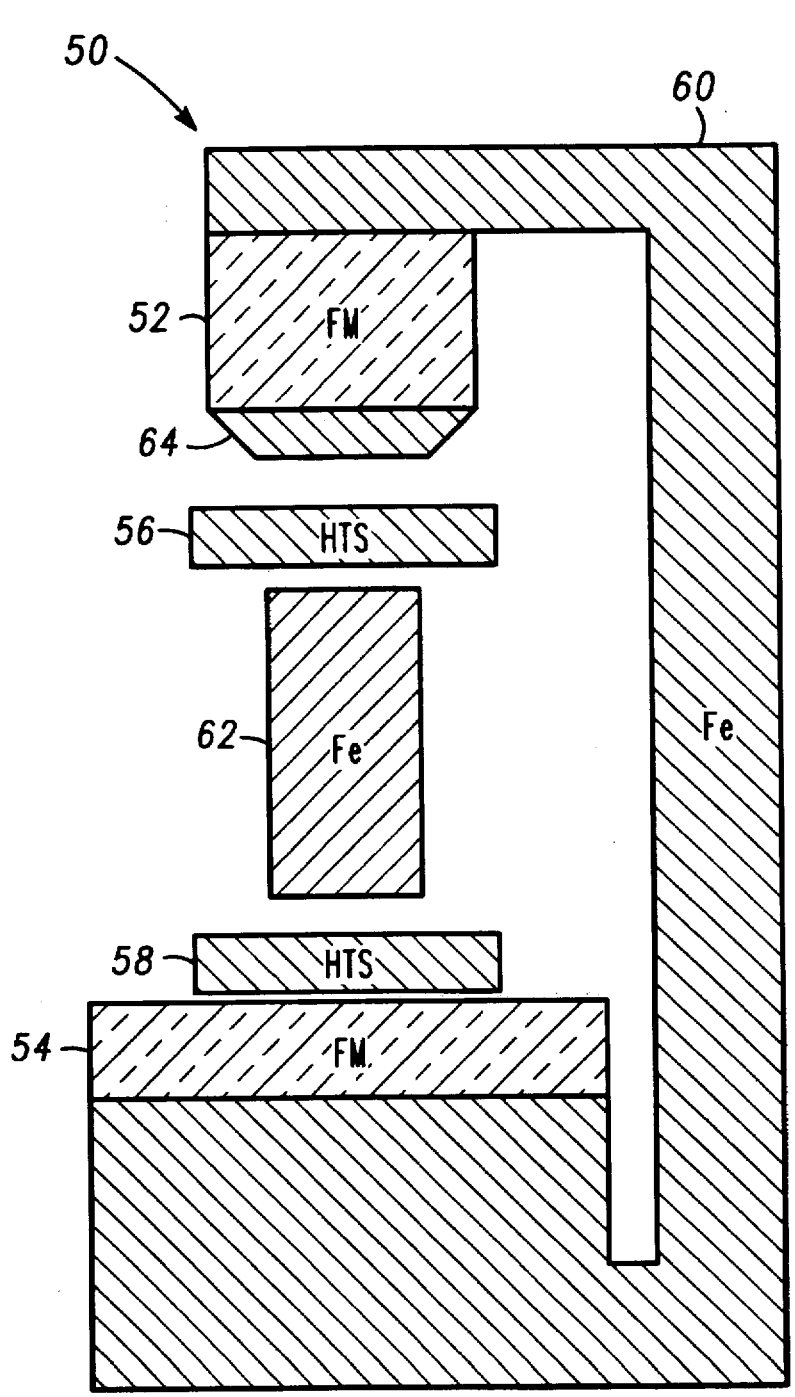
FIG. 9 shows an alternative embodiment of the bearing shown in FIG. 8.

An embodiment to achieve large levitation force in a mixed-mu high temperature superconductor bearing is shown in FIG. 8 for a ring geometry. The bearing assembly 50 comprises an upper permanent magnet 52, a lower permanent magnet 54, an upper high temperature superconductor 56, a lower high temperature superconductor 58, an iron flux return path 60, and a ring-shaped ferromagnetic rotor 62. The dimensions of the permanent magnets 52 and 54 are chosen so as to minimize $d^2H/dz^2$. In a variation on this embodiment additional permanent magnets and iron pole pieces 64 can be inserted into the system to further minimize $d^2H/dz^2$, as shown for example in FIG. 9.

The preferred embodiments of the present invention provide a low-loss mixed-mu high temperature superconductor bearings that can be used to achieve a high-efficiency flywheel energy storage device. The configurations also overcome reluctance instabilities in mixed-mu high temperature superconductor bearings, are able to obtain high speeds, and high levitation pressures.

While preferred embodiments of the invention have been shown and described, it will be clear to those skilled in the art that various changes and modifications can be made without departing from the invention in its broader aspects as set forth in the claims provided hereinafter.

What is claimed is:

1. A mixed-mu superconducting bearing, comprising:

a ferrite structure disposed for rotation adjacent a stationary superconductor material structure and a stationary permanent magnet structure, said ferrite structure being levitated by said stationary permanent magnet structure.

2. The bearing as defined in claim 1, wherein said ferrite structure comprises sintered ferrite.

3. The bearing as defined in claim 1, wherein said ferrite structure includes a ferrite disposed in an epoxy matrix.

4. The bearing as defined in claim 1, wherein said ferrite structure includes ferrite powder mixed with a fiber composite winding.

5. A mixed-mu superconducting bearing, comprising:

a steel structure disposed for rotation adjacent a stationary superconductor material structure and a stationary permanent magnet structure, said steel structure being levitated by said stationary permanent magnet structure.

6. The bearing as defined in claim 5, wherein said steel structure includes steel powder mixed with a fiber composite winding.

7. The bearing as defined in claim 5, wherein said steel structure includes steel powder in an epoxy matrix.

8. A mixed-mu superconducting bearing, comprising:

a rotor disposed for rotation between a pair of stationary superconductor material structures, said pair of stationary superconductor structures being disposed between a pair of stationary permanent magnet structures.

9. The bearing as defined in claim 8, wherein said stationary permanent magnet structures are coupled by a rigid structure.

10. The bearing as defined in claim 8, wherein said rigid structure comprises iron.

11. The bearing as defined in claim 8, wherein said rotor comprises iron.

12. The bearing as defined in claim 8, wherein said bearing further includes stationary iron pieces disposed adjacent at least one of said stationary superconductor structures.

13. The bearing as defined in claim 8, wherein said bearing further includes supplemental stationary permanent magnets disposed adjacent at least one of said stationary superconductor structures and adjacent said rotor.

* * * * *

UNITED STATES PATENT AND TRADEMARK OFFICE
CERTIFICATE OF CORRECTION

PATENT NO. : 5,722,303
DATED : March 3, 1998
INVENTOR(S) : Hull, et al

It is certified that error appears in the above-identified patent and that said Letters Patent is hereby corrected as shown below:

In Column 1, line 39, delete "traits" and insert --units--.

Signed and Sealed this

Thirteenth Day of October 1998

Attest:

BRUCE LEHMAN

*Attesting Officer*  *Commissioner of Patents and Trademarks*